(12) United States Patent
Wu et al.

(10) Patent No.: US 8,642,522 B2
(45) Date of Patent: Feb. 4, 2014

(54) POUR POINT DEPRESSANT FOR HYDROCARBON COMPOSITIONS

(75) Inventors: Margaret M. Wu, Skillman, NJ (US); David J. Baillargeon, Cherry Hill, NJ (US); Andrew Jackson, Pennington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 625 days.

(21) Appl. No.: 12/133,927

(22) Filed: Jun. 5, 2008

(65) Prior Publication Data

US 2009/0305926 A1 Dec. 10, 2009

(51) Int. Cl.
*C10M 143/00* (2006.01)

(52) U.S. Cl.
USPC .......................................................... 508/591

(58) Field of Classification Search
USPC .......................................................... 508/591
See application file for complete search history.

(56) References Cited

U.S. PATENT DOCUMENTS

| | | | |
|---|---|---|---|
| 4,990,711 A | * | 2/1991 | Chen et al. ..................... 585/302 |
| 5,105,038 A | * | 4/1992 | Chen et al. ....................... 585/10 |
| 5,487,763 A | | 1/1996 | More et al. |
| 5,641,736 A | | 6/1997 | Forbus |
| 6,017,859 A | | 1/2000 | Rossi et al. |
| 6,420,618 B1 | | 7/2002 | Berlowitz et al. ............. 585/310 |
| 6,811,683 B2 | | 11/2004 | Davis et al. |
| 7,344,631 B2 | | 3/2008 | Bishop et al. |

FOREIGN PATENT DOCUMENTS

| | | |
|---|---|---|
| WO | WO 2004/033595 | 4/2004 |
| WO | 2007/011832 | 1/2007 |
| WO | WO 2007011832 A1 * | 1/2007 |
| WO | WO 2007/070691 | 6/2007 |
| WO | WO 2007/145924 | 12/2007 |
| WO | WO 2007/146081 | 12/2007 |

* cited by examiner

*Primary Examiner* — Taiwo Oladapo
(74) *Attorney, Agent, or Firm* — Robert A. Migliorini

(57) ABSTRACT

Disclosed in one embodiment is a hydrocarbon blend made from 0.001 to 10 wt % of at least one poly-α-olefin, by weight of the blend, the at least one poly-α-olefin having a $Kv^{100}$ within the range of from 10 to 3000 cSt and a molecular weight distribution within the range of from 1.0 to 4.5; and a base stock having a $Kv^{100}$ below 20.0 cSt; wherein the at least one poly-α-olefin is present in an amount sufficient to lower the pour point of the blend by at least 5° C. relative to the pour point of the base stock. In certain embodiments the blend is formed by (a) reacting a catalyst composition and a feed containing at least two sets of α-olefins, wherein the first set of α-olefins is selected from $C_4$ to $C_{12}$ α-olefins and the second set of α-olefins is selected from $C_{14}$ or larger α-olefins. The α-olefin feed may have a number average carbon number of at least 8 carbon atoms or greater.

7 Claims, No Drawings

POUR POINT DEPRESSANT FOR HYDROCARBON COMPOSITIONS

FIELD OF THE INVENTION

The present invention relates in general to lubricant and fuel compositions, and more particularly to a class of poly-α-olefins that are capable of lowering the turbidity and pour point of low viscosity hydrocarbon base stocks, while maintaining the overall viscosity of the base stock if desired.

BACKGROUND OF THE INVENTION

Since the advent of the automobile, there has been a need to improve lubricating oils. One concern in lubricating automobile engines is the low temperature behavior of the lubricant. Automobile original equipment manufacturers ("OEMs") are concerned with the wax contained in nearly all refined mineral lubricants waxes which can crystallize at low temperatures and prevent the lubricant from flowing. There is an expectation that modern high-performance lubricants will maintain a desirable viscosity and prevent wear under real-life operating conditions. This is especially challenging when the conditions are cold for long periods of time such as in Canada and northern parts of the U.S. Pour point depressants (or "PPDs") are typically used to improve the flow of lubricants in coldo weather. Common PPDs are based on polyacrylates and fumarates. However, these PPDs can be expensive and have relatively poor stability given their functionality. With changing needs in the marketplace, selection of the "right" pour point depressant has never been more important than it is today. Equipment manufacturers and users are demanding lubricants that deliver greater efficiency and greater durability. At the same time, new specifications for engine and driveline lubricants place tougher limits on low-temperature fluidity. Further, base oil slates are continually changing, with growing use of severely hydrotreated API Group II and III oils.

Some lubricant compositions that include polyolefins are disclosed in U.S. Pat. No. 6,420,618, and WO 2007/146081, WO 2007/145924, WO 2007/070691, and WO 004/033595. While some of these compositions have improved pour points relative to the base stock, there is still a need for a lubricant that has higher performance and a lower pour point.

A similar situation exists for modern fuel compositions, especially distillate fuels. The distillate fuel can be made from conventional petroleum refining process or made from gas to liquids ("GTL") technology or from coal or bitumen to liquid ("CTL") technology. Examples of such distillate fuels can be found in U.S. Pat. No. 6,811,683, U.S. Pat. No. 7,344,631 and U.S. Pat. No. 5,487,763. Higher quality distillate fuels are in demand to provide improved pour point, lubricity, pumpability and flowability at low temperature, reduced emissions. This improvement can enhance the overall machine operability and improve fuel economy. The poly-α-olefins produced in this invention can provide such enhancement.

What is needed is a lower cost PPD having improved stability and can be used as a PPD in API Group I through IV base stocks especially gas-to-liquids ("GTL") derived base stocks, and in fuel base stocks. Such is provided herein.

SUMMARY OF THE INVENTION

Described in one embodiment is a hydrocarbon blend, a fuel or lubricant in particular embodiments, comprising from 0.001 to 10 wt % of at least one poly-α-olefin, by weight of the blend, the at least one poly-α-olefin having a $Kv^{100}$ within the range of from 10 to 5000 cSt and a molecular weight distribution within the range of from 1.0 to 4.5; and a base stock having a $Kv^{100}$ below 20.0 cSt; wherein the at least one poly-α-olefin is present in an amount sufficient to lower the pour point of the hydrocarbon blend by at least 5° C. relative to the pour point of the base stock. In certain embodiments, the base stock is a lube base stock or fuel base stock.

Also described herein in one aspect is a method of forming a hydrocarbon blend, a fuel or lubricant in particular embodiments, comprising: (a) reacting a catalyst composition and a feed containing at least two sets of α-olefins, wherein the first set of α-olefins is selected from $C_4$ to $C_{13}$ α-olefins and the second set of α-olefins is selected from $C_{14}$ or larger α-olefins and forming at least one poly-α-olefin having a $Kv^{100}$ of at least 10.0 cSt; and (b) combining the at least one poly-α-olefin with a base stock or fuel base stock having a $Kv^{100}$ value of less than 20.0 cSt to form the hydrocarbon blend.

Described in another aspect is a method of forming a hydrocarbon blend, a fuel or lubricant in particular embodiments, comprising: (a) reacting a catalyst composition and an α-olefin feed having a number average carbon number of at least 8 carbon atoms to form at least one poly-α-olefin having a $Kv^{100}$ of at least 10.0 cSt; and (b) combining the at least one poly-α-olefin with a base stock having a $Kv^{100}$ value of less than 20.0 cSt to form the hydrocarbon blend.

The various descriptive elements and numerical ranges disclosed herein can be combined with other descriptive elements and numerical ranges to describe preferred embodiments of the invention(s); further, any upper numerical limit of an element can be combined with any lower numerical limit of the same element.

DETAILED DESCRIPTION OF THE INVENTION

All fluid "viscosities" described herein, unless specified, refer to the 100° C. kinematic viscosities in centistokes ("cSt") measured according to ASTM D445 100° C. ("$Kv^{100}$"). All viscosity index ("VI") values are measured according to ASTM D2270.

As used herein, a "lubricant" refers to a liquid substance that can be introduced between two or more moving surfaces and lower the level of friction between the moving surfaces. In one embodiment, the "lubricant" is a material comprising from 0.01 to 10 wt % of at least one poly-α-olefin, by weight of the lubricant, and having a $Kv^{100}$ within the range of from 10 to 5000 cSt, and at least one type of hydrocarbon base stock having a $Kv^{100}$ below 20.0 cSt. The "hydrocarbon compositions" in certain embodiments are lubricants.

As used herein, a "fuel" is any substance that evolves energy in a controlled chemical reaction; in the present description, hydrocarbon materials, preferably those that are liquid at room temperature, are a fuel, reacted with an oxidant to evolve energy. In one embodiment, the "fuel" is a material comprising from 0.001 to 10 wt % of at least one poly-α-olefin, by weight of the fuel, and having a $Kv^{100}$ within the range of from 10 to 5000 cSt, and at least one type of fuel base stock having a $Kv^{100}$ below 20.0 cSt. The "hydrocarbon compositions" in certain embodiments are fuels.

As used herein, a "base stock" is used to describe a hydrocarbon fluid that does not contain the at least one poly-α-olefin described below, and in one embodiment is the primary component, by volume, of the final lubricant or fuel. The term "base stock" includes the distillate fuel to lube range molecules, which is a continuum and a mixture of organic molecules of greater than $C_{10}$. The lower boiling fractions, usually from $C_{10}$ to $C_{22}$, are used as distillate fuel or "fuel base stock"; higher boiling fractions are used for lubricant base stocks. In one embodiment, the base stock (for fuel, lubricant or other) has a VI of at least 100, and at least 120 in another embodiment. In certain embodiments, the base stock has a pour point below 10 or −10 or −15° C. In certain embodiments the base stock is a Group II, III or GTL base stock. In certain embodiments, the base stock has a $Kv^{100}$ value of less than 10 or 20 or 30 cSt, and in other embodiments, greater than 0.1 or 1 or 3 cSt.

Non-limiting examples of hydrocarbon base stocks (or "base stocks") suitable in lubricants include API Group I, Group II, Group III, Group IV, Group V and Group VI base stocks and hydrocarbonaceous fluids derived from Fischer-Tropsch process or Gas-to-Liquid ("GTL") process.

Gas-To-Liquids base stocks include base stocks and/or base oils derived from one or many possible types of GTL processes. The GTL process generally refers to a chemical conversion of natural gas, mostly methane, into synthesis gas (mainly CO and hydrogen). Alternatively, solid coal can also be converted into synthesis gas of mainly CO and hydrogen. The synthesis gas is then converted into mostly linear paraffins by Fishcher-Tropsch process. The linear paraffins have wide molecular size distributions. The high molecular weight linear paraffinic fraction of $C_{25}$ and higher can be isolated by distillation or fractionation and then subjected to hydro-isomerization by different catalysts into lubricant base stocks. This GTL base stock has $Kv^{100}$ of 3 to 20 or 30 cSt in certain embodiments. The GTL base stocks and/or base oil may be used as such or in combination with other hydrodewaxed or hydroisomerized, catalytic or solvent dewaxed lube base stock. In one embodiment, the GTL useful in the lubricants described herein have a VI of at least 100, and at least 120 in another embodiment. In certain embodiments, the GTL base stock has a pour point within the range of from 20 or 10° C. to −15 or −20° C. The GTL lube base stocks and the process to produce these base stocks can be found in U.S. Pat. No. 7,344,631, U.S. Pat. No. 6,846,778, U.S. Pat. No. 7,241,375, U.S. Pat. No. 7,053,254, or WO2005121280 A1. Generally, any lube base stock derived from the GTL process can be used in the blends described herein.

One example of a GTL base stock is one comprising paraffinic hydrocarbon components in which the extent of branching, as measured by the percentage of methyl hydrogens ("branching index" or "BI"), and the proximity of branching, as measured by the percentage of recurring methylene carbons which are four or more carbons removed from an end group or branch ($CH_2 \geq 4$), are such that: (a) BI−0.5 ($CH_2 \geq 4$)>15; and (b) BI+0.85 ($CH_2 \geq 4$)<45 as measured over said liquid hydrocarbon composition as a whole.

Another example of a GTL base stock is also characterized as comprising a mixture of branched paraffins, characterized in that the lubricant base oil contains at least 90% of a mixture of branched paraffins, wherein said branched paraffins are paraffins having a carbon chain length of $C_{20}$ to $C_{40}$, a molecular weight of 280 to 562, a boiling range of 343° C. to 566° C., and wherein said branched paraffins contain up to four alkyl branches and wherein the free carbon index of said branched paraffins is at least 3. The GTL base stocks, and the method for measuring the branching index, are described in more detail in, for example, WO 2007/070691.

The fuel "base stock" can be for example the middle distillate fuel oils, such as a diesel fuel, aviation fuel, kerosene, fuel oil, jet fuel, heating oil etc. Generally, suitable fuels base stocks are those boiling in the range of 120° to 500° C., (ASTM D1160), those boiling on the range 150° to 400° C. in another embodiment. A representative heating oil specification calls for a 10% distillation point no higher than about 226° C., a 50% point no higher than 272° C. and a 90% point of at least 282° C., and no higher than 338° C. to 343° C., although some specifications set the 90% point as high as 357° C. In certain embodiments, heating oils are made of a blend of virgin distillate, for example, gas oil, naphtha, etc. and cracked distillates, for example, catalytic cycle stock. A representative specification for a diesel fuel base stock includes a minimum flash point of 38° C. and a 90% distillation point between 282° C. and 338° C. (See ASTM D-396 and D-975). These distillate fuel base stocks can be made from conventional petroleum refining processes or they can be made from "gas-to-liquid" (GTL) or "coal-to-liquid" ("CTL") technology.

As used herein, a "poly-α-olefin" is in one embodiment a copolymer having a $Kv^{100}$ within the range of from 10 or 20 to 1000 or 2000 or 5000 cSt, the copolymer produced by reacting a catalyst composition with a feed of α-olefin monomers. The blends described herein include at least one poly-α-olefin as described herein. As used herein, a "copolymer" is not limited to polymers made up of two different monomer derived units, but can include three, four or more different comonomer derived units. The catalyst composition can comprise any known compound(s), alone or in combination, capable of catalyzing the production of polyolefins from olefin monomers, non-limiting examples of which are Ziegler-Natta catalysts, chrome oxide based catalysts, Group 4 amide/imide coordination catalysts, and metallocene catalysts, each with an optional activator such as an alumoxane or non-coordinating anion (e.g., bulky borate compounds). In certain embodiments, the at least one poly-α-olefin is produced using a catalyst composition comprising a metallocene and an activator.

The method of forming the at least one poly-α-olefin can be described in two complementary aspects. In a first aspect, the at least one poly-α-olefin is produced by reacting a catalyst composition with an olefin feed having a certain number average carbon number. In a second aspect, the at least one poly-α-olefin is produced by reacting a catalyst composition with one or more olefins selected from two sets of olefins: the first set being olefins within the range of $C_4$ to $C_{13}$ α-olefins, and the second set being olefins greater than or equal to $C_{14}$ α-olefins. In yet another aspect, the method of forming the at least one poly-α-olefin can be described by a combination of the first and second aspects.

Thus, in one aspect, the at least one poly-α-olefin is produced by reacting a catalyst composition and an α-olefin feed having a number average carbon number of at least 8 carbon atoms, and at least 9 carbon atoms in another embodiment, and at least 10 carbon atoms in another embodiment and at least 11 carbon atoms in yet another embodiment, and at least 11.5 in yet another embodiment. In yet another embodiment, the α-olefin feed has an number average carbon number within the range of from 8 to 15 carbon atoms, and from 10 to 15 carbon atoms in another embodiment, and from 10.5 to 14.5 carbon atoms in another embodiment, and from 10 to 14 carbon atoms in yet another embodiment. The "feed" may be continuous or batch-wise, meaning that a constant supply of the α-olefins can be provided to the components being reacted or a single amount is added to the components being reacted until the reaction is stopped, or another fresh "batch" of feed is introduced.

In certain embodiments, the α-olefin feed comprises at least two α-olefins selected from the group consisting of $C_4$ to $C_{24}$ α-olefins and mixtures thereof. In another embodiment, the α-olefin group comprises of $C_5$ to $C_{24}$ α-olefins and mixtures thereof. In certain embodiments, small amounts of even higher α-olefins of $C_{24-32}$ can also be present, from 0.01 to 5 wt % in one embodiment. In yet another embodiment, the α-olefin group consisting essentially of $C_6$ to $C_{24}$ α-olefins and mixtures thereof, meaning that lower or higher olefins have been separated out from the $C_6$ to $C_{24}$ feed as much as is practical.

In yet another embodiment, the α-olefin feed comprises at least two α-olefins selected from the group consisting of $C_6$ to $C_{24}$ α-olefins and mixtures thereof. The feed comprises within the range of from 0.1 to 15 wt % $C_6$ α-olefins and at least 8 wt % $C_{18}$ α-olefins, based on the weight of the feed, in yet another embodiment. In certain embodiments, the α-olefins that make up the feed are linear α-olefins.

In certain embodiments, the α-olefin feed consists essentially of two or more olefins selected from the group consisting of $C_6$ to $C_{24}$ α-olefins. The α-olefin feed consists essentially of two or more olefins selected from 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene in yet another embodiment. The α-olefin feed consists essentially of 1-hexene, 1-octene, 1-decene, 1-dodecene, 1-tetradecene, 1-hexadecene and 1-octadecene in yet another embodiment. In certain embodiments, ethylene is substantially absent from the α-olefin feed; and ethylene and propylene are substantially absent from the α-olefin feed in a particular embodiment. By "substantially absent," what is meant is that the ethylene or ethylene/propylene are not present in any detectable level up to a level of 1.5 wt % of the feed.

In another aspect, the at least one poly-α-olefin is formed by contacting a catalyst composition with an α-olefin feed selected from two sets of α-olefins. The first set of α-olefins is at least one or more of the olefins selected from $C_4$ to $C_{13}$ α-olefins in one embodiment, $C_5$ to $C_{12}$ α-olefins in another embodiment, and $C_6$ to $C_{12}$ α-olefins in yet another embodiment, and $C_6$ to $C_{10}$ α-olefins in yet another embodiment. In one embodiment, at least one olefin is selected from the second set of α-olefins, and only one is selected in another embodiment, and only two are selected from the second set in yet another embodiment.

In certain embodiments, the first set of α-olefins comprises 10 or 15 or 20 or 30 or 40% to 70 or 80 or 90% of the total α-olefin feed. Any one or more of the $C_4$ to $C_{13}$ α-olefins in one embodiment, and any one or more of the $C_5$ to $C_{12}$ α-olefins in another embodiment, or any one or more of the $C_6$ to $C_{10}$ α-olefins in yet another embodiment can be used. The balance of the feed is selected from the second set of $C_{14}$ or larger α-olefins. In certain embodiments, at least 20%, or 30%, or 40% of the α-olefin feed comprises the $C_{14}$ or larger α-olefins; and the feed comprises less than 90% $C_{14}$ or larger α-olefins in another embodiment.

In certain embodiments, the mixed α-olefin feed comprising the two sets of α-olefins is preferred to have an number average carbon number of at least 8 carbon atoms, and a number average carbon number of at least 9 carbon atoms in another embodiment, and a number average carbon number of at least 10 carbon atoms in yet another embodiment, and at least 10.1 carbon atoms in yet another embodiment, and at least 10.2 carbon atoms in yet another embodiment, and at least 10.5 carbon atoms in yet another embodiment, and at least 11 carbon atoms in yet another embodiment and at least 11.5 carbon atoms in yet another embodiment. In yet another embodiment, the α-olefin feed has an number average carbon number within the range of from 8 to 15 carbon atoms, and from 10 to 15 carbon atoms in another embodiment, and from 10.5 to 14.5 carbon atoms in another embodiment, and from 10 to 14 carbon atoms in yet another embodiment.

As with the first described aspect of producing the at least one poly-α-olefin, the ethylene, or ethylene/propylene is substantially absent from the feed in certain embodiments, and the feed may consist essentially of linear α-olefins in other embodiments.

The α-olefin feed as described herein is "reacted" with a catalyst composition to form at least one poly-α-olefin. The term "catalyst composition" is defined herein to mean a catalyst precursor/activator pair, such as a metallocene/activator pair. When the term "catalyst composition" is used to describe such a pair before activation, it means the unactivated catalyst (precatalyst) together with an activator and, optionally, a co-activator (such as a trialkylaluminum compound). When it is used to describe such a pair after activation, it means the activated catalyst and the activator or other charge-balancing moiety. Furthermore, this activated "catalyst composition" may optionally comprise the co-activator and/or other charge-balancing moiety. In any case, at least one or more poly-α-olefins is "produced" (or "formed") from the reaction.

In one embodiment, the catalyst composition comprises a metallocene and an activator to form a catalyst composition. Metallocene catalyst compounds include half (one cyclopentadienyl bound to a metal center) and full (two cyclopentadienyls bound to a metal center) sandwich compounds having one or more cyclopentadienyl ligands or ligands isolobal to cyclopentadienyl ("Cp") bonded to at least one metal atom, and one or more leaving group(s) bonded to the at least one metal atom. An example of a half-sandwich compound is the so called "constrained geometry" metallocenes. The term "leaving group" refers to any ligand that can be abstracted from a metallocene catalyst compound to form a metallocene catalyst cation capable of polymerizing one or more olefins.

The Cp ligands are generally represented by one or more bonding systems comprising π bonds that can be open systems or ring systems or fused system(s) or a combination thereof. These ring(s) or ring system(s) are typically composed of atoms selected from Groups 13 to 16 atoms, and selected from the group consisting of carbon, nitrogen, oxygen, silicon, sulfur, phosphorous, boron and aluminum or a combination thereof in another embodiment. The metal atom is selected from Groups 4 through 12 of the Periodic Table of Elements in one embodiment, and as otherwise described herein. In a particular embodiment, the metallocene is a Group 4 bridged bis-Cp compound, meaning that both Cp ligands are bound to the metal center as well as each other through some "bridging" moiety as is known in the art and described below.

In one embodiment, the metallocene catalyst compounds are unbridged bis-cyclopentadienyl metallocene compounds represented by formula (1): $L^A L^B MQ_n$, wherein each $L^A$ and $L^B$ are bound to the metal center M, and each Q is bound to the metal center, n being 0 or an integer from 1 to 4, and is 1 or 2 in another embodiment, and is 2 in yet another embodiment.

In formula (1), the metal atom "M" is selected from the group consisting of Groups 3 through 10 atoms in a one embodiment; and selected from the group consisting of Groups 4, 5 and 6 atoms in a more particular embodiment, and is Zr or Hf in yet a more particular embodiment. The metal of the metallocene is not limited to being any particular oxidation state in the present invention. The Cp ligand(s) form at least one chemical bond with the metal atom M to form the "metallocene catalyst compound." The Cp ligands are distinct from the leaving groups bound to the catalyst compound in that they are not highly susceptible to substitution/abstraction reactions.

The $L^A$ and $L^B$ groups of formula (1) are Cp ligands, such as cycloalkadienyl ligands and heterocyclic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl), substituted versions thereof (as described in more detail below), and heterocyclic versions thereof.

Independently, each $L^A$ and $L^B$ may be unsubstituted or substituted with a combination of substituent groups R. Non-limiting examples of substituent groups R include one or more from the group selected from halogens; hydrogen; and linear, branched, or cyclic alkyl $C_1$ to $C_{20}$ or $C_{30}$ or $C_{50}$ groups; and alkenyl, or aryl groups, or combination thereof. Non-limiting examples of alkyl or aryl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Also, at least two R groups, two adjacent R groups in certain embodiments, are joined to form a ring structure having from 3 to 30 atoms selected from carbon, nitrogen, oxygen, phosphorous, silicon, germanium, aluminum, boron or a combination thereof.

The leaving groups Q of formula (1) are monoanionic labile ligands bound to M. Depending on the oxidation state of the metal, the value for n is 0, 1 or 2 such that formula (1) above represents a neutral metallocene catalyst compound, or a positively charged compound. Examples of leaving groups include fluorine atoms, chlorine atoms, bromine atoms and iodide atoms, hydrogen atoms, alkoxy groups, methyl groups, ethyl groups, and other alkyl groups.

In one embodiment, the metallocene catalyst compounds of the invention include those of formula (1) where $L^A$ and $L^B$ are bridged to each other by a bridging group, "A". These bridged compounds are referred to as bridged metallocene catalyst compounds and can be represented by formula (2): $L^A(A)L^B MQ_n$, wherein each $L^A$ and $L^B$ are bound to the metal M, and each Q is bound to the metal center, n being 0 or an integer from 1 to 4, 1 or 2 in certain embodiments, and 2 in yet another embodiment; the groups $L^A$, $L^B$, M and Q are as defined in (1); and the divalent bridging group "A" is bound to both $L^A$ and $L^B$ through at least one bond or divalent moiety to each.

Non-limiting examples of bridging group "A" from formula (2) include divalent bridging groups containing at least one Group 13 to 16 atom, such as but not limited to at least one of a carbon, oxygen, nitrogen, silicon, boron, germanium and tin atom or a combination thereof. In certain embodiments, bridging group "A" contains a carbon, silicon or germanium atom. The "A" group contains at least one silicon atom or at least one carbon atom in a particular embodiment. The bridging group "A" may also contain substituent groups R as defined above including halogens. More particularly, non-limiting examples of bridging group "A" may be represented by $R'_2C=$, $R'_2Si=$, $—(R')_2Si(R')_2Si—$, $—(R')_2Si(R')_2C—$, $R'_2Ge=$, $—(R')_2C(R')_2C—$, $—(R')_2Si(R')_2Ge—$, $—(R')_2Ge(R')_2C—$, R'N—, R'P=, $—(R')_2C(R')N—$, $—(R')_2C(R')P—$, $—(R')_2Si(R')N—$, $—(R')_2Si(R')P—$, $—(R')_2Ge(R')N—$, and $—(R')_2Ge(R')P—$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' may be joined to form a ring or ring system; and Q is as described above.

It is contemplated that the metallocene catalyst components described above include their structural or optical or enantiomeric isomers (racemic mixture), and may be a pure enantiomer in one embodiment. Further, as used herein, a single, bridged, asymmetrically substituted metallocene catalyst component having a racemic and/or meso isomer does not, itself, constitute at least two different bridged, metallocene catalyst components. The "metallocene catalyst component" useful in the present invention may comprise any combination of any "embodiment" described herein, for example, any combination of LA, LB, M, Q, A and R groups.

The catalyst composition described herein comprises a metallocene and an activator in one embodiment. The catalyst composition may include a support material as is known in the art. As used herein, the term "activator" is defined to be any compound or combination of compounds, supported or unsupported, which can activate a single-site catalyst compound (e.g., metallocenes, Group 4 imide/amine coordination compounds, etc.), such as by creating a cationic species from the catalyst component. Typically, this involves the abstraction of at least one leaving group (Q group in the formulas/structures above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides) and so called non-coordinating activators ("NCAs") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis(pentafluorophenyl)boron and/or a trisperfluorophenyl boron metalloid precursors to activate desirable metallocenes described herein. MAO and other aluminum-based activators are well known in the art. Ionizing activators are well known in the art and may be associated with or bound to a support, either in association with the catalyst component (e.g., metallocene) or separate from the catalyst component.

Examples of neutral ionizing activators include Group 13 tri-substituted compounds, in particular, tri-substituted boron, tellurium, aluminum, gallium and indium compounds, and mixtures thereof. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated," it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di(trifluoromethyl)phenyl)boron, tris(di-t-butylmethylsilyl)perfluorophenylboron, and other highly fluorinated trisarylboron compounds and combinations thereof, and their aluminum equivalents.

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di(isopropyl)ammonium tetra(pentafluorophenyl)boron, dicyclohexylammonium tetra(phenyl)boron and the like; triaryl carbonium salts (trityl salts) such as triphenylcarbonium tetra(phenyl)boron and triphenylcarbonium tetra (pentafluorophenyl)boron; and triaryl phosphonium salts such as triphenylphosphonium tetra(phenyl)boron, triphenylphosphonium tetra(pentafluorophenyl)boron, tri(methylphenyl)phosphonium tetra(phenyl)boron, tri(dimethylphenyl)phosphonium tetra(phenyl)boron and the like, and their aluminum equivalents.

When a non-coordinating anion ("NCA") or an ionic activator is used, the molar ratio of the activator to metallocene is usually within the range of 10:1 to 1:10, and within the range of from 0.5:1 to 2:1 in certain embodiments. When a NCA or an ionic activator is used, a co-activator may also be used. The molar ratio of the co-activator (when present) to metallocene is in the range of 1000:1 to 10:1 in one embodiment, and 500:1 to 20:1 in another embodiment, and 200:1 to 20:1 in yet another embodiment, and 150:1 to 20:1 in yet another embodiment. In one embodiment, a scavenger is also used to scavenge any catalyst poison. The scavenger can be the same compound as the co-activator, an alkyl aluminum compound in one embodiment.

When an alumoxane such as methylaluminoxane (MAO) is used as the activator, the molar ratio of activator to metallocene is usually within the range of 5:1 to 5000:1, between 1000:1 to 500:1 in certain embodiments, or from 500:1 or 300:1 or 50:1 to 1:1 or 20:1 or 100:1 in other embodiments.

The "reacting" (or "reaction") between the catalyst composition and the α-olefin feed takes place by any suitable means known in the art suitable for forming polyolefins. By "reacting", what is meant is a chemical reaction that may occur as by combination and/or replacement and/or rearrangement of chemical bonds between the components combined with one another; in the particular invention, the reaction is that of a catalyzed combination of monomer units repeatedly to form a polymer. In certain embodiments, the reaction may take place as a batch wise reaction in a batch reactor, and in certain embodiments the reacting takes place in a continuous reactor, examples of which include gas phase reactors, slurry reactors, solution reactors, the later two of which may be high pressure reactors. When present, a diluent may be used that may include the monomers themselves.

The conditions present during the reaction are such to produce at least one poly-α-olefin as described herein. The reaction takes place at a temperature within the range of from 10 or 20 to 80, or 100, or 120, or 200° C. in certain embodiments. Further, the reaction takes place at a pressure of greater than 1.0 or 1.1 or 1.2 or 1.4 MPa in certain embodiments, and between 0.8 or 1.0 MPa to 2.0 or 3.0 MPa in certain embodiments. The polymerization reaction is usually exothermic. In order to maintain a constant and/or stable temperature, a heat removal means is employed in certain embodiments. Heat removal can be conducted using many know methods, such as cooling by circulation coolant through a tube inside the reactor, by feeding pre-cooled feed streams, by cooling a portion of reactor content by circulating the content through a external cooling system, or a combination of these methods.

In certain embodiments, the catalyst concentration is in the range of 0.01 or 0.5 microgram of metallocene compound per gram of olefin feed to 20 or 50 or 100 or 1000 microgram of metallocene compound per gram of olefin feed.

In certain embodiments, the polymerization reaction is conducted in the presence of hydrogen. The amount of hydrogen feed can range from 5 or 10 or 20 ppm in the reactor system to 1000 or 4000 or 5000 or 10,000 ppm in one embodiment, an exemplary value being within the range of 10 to 1000 ppm. In another embodiment, the amount of hydrogen is controlled by the partial pressure of hydrogen in the reactor system. In this case, 5 or 10 psi of hydrogen to 200 or 300 psi hydrogen is suitable, an exemplary value being within the range of 10 to 100 psi.

In certain embodiments an inert solvent is added to the reactor system to facilitate the mixing of reactor components and downstream filtration and operation. The reaction time can range from 5 minutes to 50 hours in one embodiment, depending on the amount of catalyst used, the desirable conversion, etc. Usually, a reaction time or residence time of 10 minutes to 25 hours is used, and between 20 minutes to 10 hours in another embodiment. The catalyst components can be deactivated and/or removed by any conventional means such as by aqueous and/or alcohol wash with optional mixing with dilute aqueous acid or base and then separating the organic component from the aqueous wash. This wash is repeated several times until the catalyst components are removed. Alternatively, the catalyst can be removed according to the method described in WO 2008010862 A1.

In certain embodiments, the at least one poly-α-olefin produced in the process has high bromine number or high degree of un-saturation. If so, in certain embodiments the at least one poly-α-olefin can be hydrogenated to remove the unsaturation. This can be accomplished by fixed-bed continuous hydrogenation, or by slurry hydrogenation using many common hydrogenation catalysts, such as supported Ni-on- Kieseiguhr catalyst. Other examples can be found in WO 2008010862 A1. Alternately, this unsaturation is left in the at least one poly-α-olefin.

In all embodiments/aspects described herein, the product of reacting the catalyst and α-olefin will result in the formation of at least one poly-α-olefin that meets the desired criteria as described herein, and more than one poly-α-olefin in other embodiments. Thus, in certain embodiments, the blends may comprise a poly-α-olefin that does not meet the desired criteria, but does comprise at least one such poly-α-olefin. Any additional poly-α-olefin in the blends can derive from any source and be formed by any means.

A poly-α-olefin can be isolated from the product mixture resulting from the reaction, which can then be combined with additives and/or base stocks to form a lubricant. In other embodiments, the reaction mixture is directly combined with the product of the reaction. The at least one poly-α-olefin in one embodiment is a polyolefin having a $Kv^{100}$ within the range of from 10 to 5000 cSt. The at least one poly-α-olefin has a $Kv^{100}$ below 2000 or 2500 or 3000 or 3500 or 4000 or 4500 or 5000 cSt in certain other embodiments. Further, the at least one poly-α-olefin has a $Kv^{100}$ within the range of from 10 or 15 or 20 or 50 to 500 or 1000 or 1500 or 2000 or 2500 or 4000 or 3000 or 5000 cSt in yet other embodiments. In yet other embodiments, the at least one poly-α-olefin has a VI of greater than 200 or 220 or 250, and within the range of from 100 or 150 or 200 to 300 or 400. In yet other embodiments, the molecular weight distribution (weight average molecular weight/number average molecular weight, or "MWD") of the at least one poly-α-olefin is within the range of from 1.0 or 1.2 or 1.5 to 3.5 or 4.0 or 4.5 as determined by Gel Permeation Chromatography, the measurement having a typical accuracy of ±0.15 units.

The at least one poly-α-olefin consists essentially of two or more $C_4$ or $C_6$ to $C_{18}$ or $C_{24}$ α-olefin-derived units in one embodiment. In other embodiments, the at least one poly-α-olefin consists essentially of 1-hexene-derived units, 1-octene-derived units, 1-decene-derived units, 1-dodecene-derived units, 1-tetradecene-derived units, 1-hexadecene-derived units and 1-octadecene-derived units. In yet another embodiment, the at least one poly-α-olefin consists essentially of at least three olefins selected from the group consisting of 1-hexene-derived units, 1-octene-derived units, 1-decene-derived units, 1-dodecene-derived units, 1-tetradecene-derived units, 1-hexadecene-derived units and 1-octadecene-derived units.

The at least one poly-α-olefin is present in (or added to) the hydrocarbon base stock in an amount to lower the pour point of the blend by at least 5 or 10 or 15° C. relative to the pour point of the base stock in one embodiment. In certain embodiments, the at least one poly-α-olefin is present in the blend from 0.001 or 0.01 to 5 or 7 or 10 wt % poly-α-olefin, by weight of the base stock. The base stock comprises within the range of from 99.999 to 40 or 50 or 60 or 70 wt % of the blend in certain embodiments, or in a range as described herein. The remainder of the lubricant or fuel may be made up of additives, some of which are listed herein.

Thus, in one aspect is provided a lubricant comprising a poly-α-olefin having a $Kv^{100}$ within the range of from 10 to 1000 or 3000 cSt (or as otherwise described herein) and a molecular weight distribution within the range of from 1.0 to 4.5 (or as otherwise described herein); and a base stock having a $Kv^{100}$ below 20.0 cSt (or as otherwise described herein); wherein the at least one poly-α-olefin is present in an amount sufficient to lower the pour point of the lubricant relative to the pour point of the untreated base stock.

In certain embodiments, the addition of the at least one poly-α-olefin to a base stock will not substantially affect the blend's viscosity. Thus, in one embodiment the at least one poly-α-olefin is added to the base stock to form a blend such that the pour point of the blend is at least 5 or 10° C. less than the pour point of the base stock, wherein the $Kv^{100}$ changes by less than 5 or 10%.

In certain embodiments, the at least one poly-α-olefin consists essentially of two or more $C_6$ to $C_{24}$ α-olefin-derived units. Also, in certain embodiments, ethylene-derived units are substantially absent from the at least one poly-α-olefin, and ethylene- and propylene-derived units are substantially absent in yet another embodiment, "substantially absent" meaning that if those groups are present in the polymer chain, they are present to no greater than 0.5 or 1 or 1.5 wt % of the polymer.

The lubricant can also include any one or more additives as is common in the art. In one embodiment, the lubricant comprises one or more additives, wherein the additive is selected from the group consisting of oxidation inhibitors, antioxidants, dispersants, detergents, corrosion inhibitors, rust inhibitors, metal deactivators, anti-wear agents, extreme pressure additives, anti-seizure agents, non-olefin based pour point depressants, wax modifiers, viscosity index improvers, viscosity modifiers, fluid-loss additives, seal compatibility agents, friction modifiers, lubricity agents, anti-staining agents, chromophoric agents, defoamants, demulsifiers, emulsifiers, densifiers, wetting agents, gelling agents, tackiness agents, colorants, and blends thereof.

In one embodiment, non-polyolefin-based pour point depressants are substantially absent, meaning that they are present, if at all, to less than 1 wt % of the lubricant. Examples of non-polyolefin-based PPDs include polyacrylates, ethylene-vinylacetate copolymer, and fumarates. Thus, in one embodiment, the "additives" comprises the list above without the "non-olefin based pour point depressants."

In another embodiment, the at least one poly-α-olefins described herein can also be used with other hydrocarbon fluids to improve the pour points or low temperature flow properties of these fluids. Examples of these hydrocarbon fluids include distillate fuels, which include jet fuels, diesel fuels, and heating oil. Specific examples of these distillate fuels are the fuels produced in the GTL process, as described in U.S. Pat. No. 7,132,042, or many of the distillate fuels produced in conventional petroleum refinery. These fuels, as produced from their manufacturing process, contain small amount of waxy components. These waxy components degrade the low temperature flowability and pour points of the fluids. When a small amount of the at least one poly-α-olefins is added to the fuels, the low temperature properties, as measured by pour points or other methods, improves significantly. The amount of poly-α-olefins in the fuel composition ranged from 0.0001 wt % to 5 wt %, preferably, 0.001 wt % to 0.5 wt % (equivalent to 10 ppm to 5000 ppm). In addition, the finished distillate fuel product may contain other additive components including detergents, lubricity improvers, combustion improvers, cetane improvers, other cold-flow improvers, filterability improvers, cloud point improvers. In addition, the fuel may contain appropriate amount of fuels or components derived from renewable resources such as bio-diesels including fatty acid alkyl esters (or methyl esters ("FAME") or ethyl esters, etc), glycerols, mono-glycerides, etc.

The one or more poly-α-olefins produced in this invention have several unique characteristics. First, in certain embodiments they may contain at least 10% or 20% or 30% or 35% or more $C_{14}$ linear α-olefin-derived units. Second, many of these poly-α-olefins, because of their high content of the $C_{14}$ linear α-olefin, have relatively high pour points. Most of the at least one poly-α-olefin having a pour point depressant effect usually have pour points higher than −15 or −10 or 0° C. Some poly-α-olefins with low pour points (less than −20° C.) have good pour point depressant properties. Therefore the method described herein may provide a poly-α-olefin with both excellent pour point and low temperature properties and still provide excellent pour point depressant properties.

In certain embodiments the pour point depressant effect or low-temperature viscometric improving effect can be optimized by ensuring that the smaller olefins selected from $C_4$ to $C_{13}$ linear α-olefin and the larger olefins selected from greater than $C_{14}$ linear α-olefin are randomly distributed in the at least one poly-α-olefin without significant clustering of smaller olefins or the larger olefins. In other words, the at least one poly-α-olefin is preferably a random poly-α-olefin, without any significant blocky segment(s) in the polymer structure. A single-site catalyst system, such as a metallocene catalyst system, is most suitable for producing such poly-α-olefin with random monomer distribution. Metallocene catalyst system polymerizes linear α-olefin of $C_4$ to $C_{24}$ α-olefins with almost equal reactivity and therefore, producing polymers with relatively random monomer distribution. Such polymer will be most desirable for low temperature improving effect of Group I to VI base stocks. Thus, in one embodiment, the single-site catalyst is chosen that results in the most random polymer.

The embodiments described herein are illustrated by the following experiments.

EXAMPLES

The α-olefins used for all the experiments, either individually or pre-mixed, were purified by mixing 1 liter of untreated raw olefin material with 20 grams of activated 13× molecular sieve and 10 grams of de-oxygenate catalyst (a reduced copper catalyst) for at least two days inside a glove box. The molecular sieve and de-oxygenate catalyst were then removed by filtration. The treated individual α-olefins were then combined to give the desirable composition. Similarly, this purification can be carried out by pumping a stream of the α-olefins, either alone or pre-mixed, through a bed of activated 13× molecular sieve alone, or through a bed of activated 13× molecular sieve followed by a bed of de-oxygenate catalyst, prior to entering the reactor.

The pour points and cloud points of the blends were measured by a Herzog pour point ("PP") apparatus model HCP852 (Walter Herzog, GmbH).

Poly-α-olefin Synthesis Experiments

Example 1

An olefin mixture containing 18.4% 1-hexene, 22.3% 1-octene, 21.6% 1-decene, 16.8% 1-dodecene, 10.4% 1-tetradecene, 6.4% 1-hexadecene and 4% 1-octadecene was used as feed. This composition is similar to the linear α-olefins produced from a typical linear α-olefin plant (ALPHA-OLEFINS APPLICATIONS BOOK Ch. 3 (ed. G. R. Lappin and J. D. Sauer, Marcel Dekker, Inc., New York, 1989)). Thirty (30) grams of this olefins mixture and 0.522 gram of a solution containing 20 mg of triisobutylaluminum (TIBA) per gram of toluene were charged into a reactor. A catalyst solution containing 11 grams of toluene, 0.0133 gram TIBA stock solution, 0.30798 mg rac-dimethylsilylbis(tetrahydroindenyl) zirconium dichloride (metallocene "A") and 0.5408 mg N,N-dimethylanilinium tetra(pentafluorophenyl)borate (cocatalyst "B") was added to the reactor with stirring while maintaining the temperature at 30° C. After about 19 hours of stirring, the reaction was discontinued by addition of about 3 ml isopropanol, followed by washing with about 120 ml of 5% sodium hydroxide solution and water. The isolated organic layer was distilled at about 160° C./1 millitorr vacuum for two hours to remove light end and isolate the desired poly-α-olefin fraction. The total yield of poly-α-olefin was 85%. The recovered poly-α-olefin properties are summarized in Table 1.

Example 2

Similar to Example 1, except a metallocene containing 70% meso- and 30% racemic-dimethylsilylbis(tetrahydroindenyl)zirconium dichloride (C) was used in the preparation.

Example 3

Similar to Example 1, except reaction was carried out at 60° C.

Example 4

Similar to Example 2, except reaction was carried out at 60° C.

Example 5

An olefin mixture containing 33.6 grams of 1-octene, 42.0 grams 1-decene and 50.4 grams 1-dodecene was charged into a round bottom flask and heated to 70° C. under $N_2$ atmosphere. A catalyst solution containing 2.34 gram 10 wt % methalumoxane (MAO) in toluene solution, 60 gram toluene and 3.7 mg of rac-dimethylsilylbis(tetrahydroindenyl)zirconium dichloride (C) was added slowly to the olefin mixture while maintaining constant temperature. The reaction was continued for 4 hours. Gas chromatograph showed that 94% olefins were converted. The reaction was quenched by addition of about 3 ml isopropanol, followed by washing with about 120 ml of 5% sodium hydroxide solution and water. The isolated organic layer was distilled at about 160° C./1 millitorr vacuum for two hours to remove any light ends. The lubricant properties are summarized in Table 1.

Example 6 is a comparative example. An identical reaction was carried out as Example 5, except a pure 1-decene was used as feed. The polydecene properties are summarized in Table 1.

Examples 1-5 demonstrated that one can produce lubricant base stocks of wide viscosity ranges with superior viscosity index ("VI", ASTM-D2270) and pour points from wide range of mixed α-olefins, ranging from $C_8$-$C_{12}$ to $C_6$-$C_{18}$. The lubricant properties are similar to those made from pure 1-decene.

Example 7

An olefin mixture containing 7.1% 1-hexene, 9.5% 1-octene, 11.9% 1-decene, 14.3% 1-dodecene, 16.7% 1-tetradecene, 19.1% 1-hexadecene and 21.4% 1-octadecene was used as feed. Thirty (30) grams of this feed was charged into a reactor at 31° C. A catalyst solution containing 0.195 grams of 10 wt % MAO in toluene, 9.7 grams of toluene and 0.308 mg of catalyst A was added to the reactor. After 3 days, the reaction was worked up in the similar manner as previous example. The poly-α-olefin properties are listed in Table 1.

Example 8

Similar to Example 1, except the feed composition was described in Example 7.

Example 9

Similar to Example 7, except that catalyst C was used.

Example 10

Similar to Example 1, except the feed composition was as described in Example 7 and the catalyst composition was catalyst C.

Example 11

Similar to Example 7, except the reaction temperature was 60° C.

Example 12

Similar to Example 7, except the metallocene used was racemic-ethylenebis(1-indenyl)zirconium dichloride (catalyst D).

Poly-α-olefin and Base Stock Blend Experiments

Example 13

A hydroprocessed lubricant base stock A was prepared according to U.S. Pat. No. 6,420,618 or WO2004/033595 with properties summarized in Table 2.

Blend 14. When 1 wt % of the Example 1 poly-α-olefin was blended with base stock A, the blend has slight increase in 100° C. viscosity. However, the pour point was decreased from −15° C. to −18° C.

Blend 15. When 20 wt % of Example 1 was blended with base stock A, the blend has 100° C. viscosity of 27.92 cSt. However, the pour point was decreased to −30° C.

Blend 16. When 0.1 wt % of Example 7 was blended with base stock A, the blend has $Kv^{100}$ of 6.14 cSt, which is only slightly higher than the starting base stock A. However, the pour point was decreased from −15° C. to −45° C.

Blends 17, 18, 19, 20 further demonstrated the same pour point depressant effect when 0.5, 1.0, 5.0 or 20 wt % of Example 7 was blended with base stock A.

Blend 21. When 0.05 wt % of Example 10 was blended with base stock A, the blend has $Kv^{100}$ of 6.12 cSt, which is only slightly higher than the starting base stock A. However, the pour point was decreased from −15° C. to −39° C.

Blends 22, 23, 24 further demonstrated the same pour point depressant effect.

Blend 25. When 0.1 wt % of Example 12 was blended with base stock A, the blend has $Kv^{100}$ of 6.12 cSt, which is only slightly higher than the starting base stock A. However, the pour point was decreased from −15° C. to −45° C.

Linear Olefin Feed Experiments

Feed Compositions: Six linear α-olefin (linear α-olefin) mixtures with different number average carbon numbers ranging from 13.24 to 9.27 were prepared according to the weights in Table 3. These feeds labeled as "Feed-1" to "Feed-6" were used for subsequent polymer synthesis using metallocene catalyst system.

General procedures for poly-α-olefin synthesis: Examples 26 to 31. All reaction operations involving metallocene catalyst system were carried out under nitrogen atmosphere to exclude air and moisture or any other catalyst poisons. To a 200 ml reaction vessel, 40 grams of mixed olefin Feed was charged, followed by 20 gram toluene, 3.232 gram of tri-isobutylaluminum ("TIBA") stock solution containing 20 mg per gram of stock solution, 0.456 mg of catalyst rac-dimethylsilylbis(tetrahydroindenyl)zirconium dichloride (catalyst A) and 0.8012 mg N,N-dimethylanilinium tetra(pentafluorophenyl)borate (activator B). The mixture was heated to reaction temperature at 70° C. After 15 hours of reaction, 5 grams of activated alumina was added to the reaction mixture and stirred for about half an hour. The product was then filtered to remove the solids. The organic filtrate was distilled at 100° C. under house vacuum of about 20 mm $H_2O$. The residual was further distilled at greater than 1 millitorr and 160° C. for two hours. The residual viscous liquid was then collected, and the viscosity properties for $Kv^{40}$, $Kv^{100}$ and pour point measurement ($Kv^{40}$ is the kinematic viscosity, per ASTM D445, at 40° C., $Kv^{100}$ is the kinematic viscosity at 100° C.) were made. The results are summarized in Table 4.

Examples 32 to 37 were prepared as in Examples 26 to 31, except that the reaction temperature was maintained at 35° C. for Feed-1 to -6. The product properties are summarized in Table 5. Generally, the poly-α-olefins in Table 5 possess higher viscosities than poly-α-olefins in Table 4.

Samples in Table 6 were prepared in similar manner to Examples 32 to 37, except different catalysts and reaction temperatures were used to produce poly-α-olefin of different tacticity and viscosity. Examples 38 and 40 had low degree of any stereo-regularity, and were mostly atactic polymer. Example 39 had high degree of syndiotactic stereo-regularity. Their properties were summarized in Table 6. Catalyst D is diphenylmethylidene(cyclopentadienyl-9-fluorenyl)zirconium dichloride, and the polymerizations were performed by combining catalyst D and activator B to form the catalyst composition.

Product Examples 26 to 40 of different amounts from 0.01 wt % to 10 wt % were then blended with 6 cSt GTL base stock ("GTL6"). The starting GTL6 has a pour point of −21° C. The blend pour point properties were summarized in Table 7. In this Table, the pour point numbers in the matrix associated with columns A through H are the pour points of the blends in different amounts of the Examples 26 to 40 samples in GTL6. For example, the blend A-26, containing 0.025 wt % Example 26 poly-α-olefin in GTL6, has a pour point of −39° C. The blend E-26 containing 0.5 wt % Example 26 poly-α-olefin in GTL6 has a pour point of −51° C. The blend C-33 containing 0.1 wt % of Example 33 poly-α-olefin in GTL has a pour point of −51° C. The blend C-36, containing 0.1 wt % Example 36 poly-α-olefin in GTL6, has a pour point of −21° C.

The data in Table 7 demonstrates several aspects of this invention: The feed number average carbon number is a factor in determining whether the products have or do not have pour point ("PP") depressant effect.

Poly-α-olefin made with feeds of number average carbon numbers of greater than 10.0 have excellent PPD effect (Examples 26-29, 32-35 and 38-40).

Poly-α-olefin made with feeds of average carbon numbers of less than 10 have very little PPD effect (Examples 30, 31, 36 and 37). These poly-α-olefins behave more as base stocks. They have excellent base stock properties, including VI and very low pour points. When they are blended in additive quantities, 0.025 wt % to 1 wt %, they show very little PPD effect. They are most suitable as blend stocks, when used in large quantity (usually greater than 5 wt %) to blend with other base stocks. When used in high amount, 5% or higher, they significantly increase the blend viscosities, increase VI, and lowering the pour points. These fluids are discussed in WO 2007/146081, WO 2007/145924, and WO 2007/070691.

Poly-α-olefins of wide viscosity range (or molecular size) are highly effective PPDs, as long as they are made from feeds with a number average carbon number greater than 10. Examples 26 to 29 poly-α-olefins have $Kv^{100}$ of 70 to 90 cSt, or Example 40 is 19.5 cSt. They are highly effective as PPDs. Examples 32-36 and 39 have high viscosities, greater than 200 cSt. Again, they are highly effective as PPDs. This wide range of viscosities available as PPD is very desirable in providing formulation flexibility. For example, sometimes it is desirable to use PPDs to improve the pour point without increasing the blend viscosity. In this case, a low viscosity PPD which will not increase blend viscosity is most suitable. Sometimes, it is desirable to increase the blend viscosity while significantly decreasing pour point at the same time. In this case, a high viscosity poly-α-olefin PPD would be most suitable.

Poly-α-olefin with atactic, isotactic or syndiotactic stereosequences are all effective as PPDs when they are made from feeds with average carbon numbers of greater than 10. Examples 38 and 40 are rich in atactic stereo sequence. Example 39 is rich in syndiotactic sequence. Examples 26 to 29 and 32 to 35 are rich in isotactic stereo-sequence. They are all effective as PPDs.

Examples 41 to 44

Examples 41 and 42 are blends of GTL6 with poly-α-olefin Example 33 and Example 34 respectively. The blends properties, including high temperature viscometrics and the low temperature viscometrics pour points, Brookfield Viscosity at −30° C. and −40° C., are summarized in Table 8. Table 8 also include the properties of pure GTL6 (Example 42) and blend property of GTL6 with a common commercial pour point depressant Acryloid™ 156 (methyl methacrylate copolymer, Rohm & Haas) (Example 43). As these data showed that blends containing an additive quantity (0.1 to 1 wt %) in GTL6 have similar viscosities as the pure GTL6 base stock. However, their pour points were decreased from −21° C. (Example 43) to −39 to −45° C. (Examples 41 and 42). The low temperature Brookfield Viscosity (as measured by ASTM D2983) was further decreased compared to the starting GTL6 base stocks, even though all the fluids have similar $Kv^{100}$, $Kv^{40}$ and VI. Furthermore, the low temperature Brookfield Viscosity of Examples 41 and 42 are better than the most commonly used PPD (Example 43), again without changing the $Kv^{100}$ and $Kv^{40}$ significantly.

Table 9 summarizes the beneficial effect of small amounts of poly-α-olefin from Examples 26 to 37 in a high viscosity GTL base stock in reducing the turbidity of the GTL base stock. High viscosity GTL base stock, produced by methods and having compositions as described in U.S. Pat. No. 7,241,375 and U.S. Pat. No. 7,132,042, often have a hazy appearance, as indicated by a high turbidity number of 1.99 at 0° C., as measured by a turbidity meter (VWR Model 800 Turbidity Meter available from VWR International). When a very small amount of poly-α-olefin Examples 27 to 37 was added to the GTL sample, the turbidity decreased to below 1.0, as shown by the blends in Table 9. These data demonstrate that poly-α-olefin made from number average carbon numbers of greater than 10 carbons are useful to reduce turbidity of high viscosity GTL base stock.

Thus, in certain embodiments the turbidity of the hydrocarbon blends, a lubricant or fuel in a particular embodiment, is less than 0.90 or 0.95 or 1.00, and within the range of from 0.50 or 0.60 to 0.90 or 1.00 in other embodiments.

TABLE 1

Poly-α-olefin property summary

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Kv@100° C. | 579.61 | 142.17 | 170.37 | 79.66 | 105.97 | 122.45 | 335.67 | 312.26 | 130.66 | 93.15 | 151.83 | 727.84 |
| Kv@40° C. | 7266.0 | 1346.4 | 1777.9 | 672.58 | 961.74 | 1080.5 | 3435.8 | 2249.6 | 1087.6 | 723.79 | 1376.20 | 7878.84 |
| VI | 259 | 210 | 208 | 195 | 200 | 218 | 249 | 289 | 221 | 213 | 218 | 290 |
| Pour Point, ° C. | −27 | −42 | −39 | −40 | −39 | −31 | −6 | −3 | −3 | −3 | 0 | −3 |

TABLE 2

Poly-α-olefin/GTL blend properties

| | Example | | | | | | | | | | | | |
|---|---|---|---|---|---|---|---|---|---|---|---|---|---|
| | 13 | 14 | 15 | 16 | 17 | 18 | 19 | 20 | 21 | 22 | 23 | 24 | 25 |
| Kv@100° C. | 6.03 | 6.41 | 27.92 | 6.14 | 6.22 | 6.34 | 7.56 | 14.38 | 6.12 | 6.11 | 6.16 | 6.22 | 6.12 |
| Kv@40° C. | 29.89 | 32.04 | 202.65 | 30.74 | 30.78 | 31.68 | 38.93 | 87.66 | 29.87 | 30.14 | 30.31 | 30.64 | 30.21 |
| VI | 141 | 144 | 166 | 140 | 144 | 143 | 154 | 160 | 146 | 143 | 144 | 145 | 143 |
| Pour Point, ° C. | −15 | −18 | −30 | −45 | −42 | −36 | −27 | −24 | −39 | −45 | −45 | −42 | −45 |

TABLE 3

Feed-1 to -6 preparation and effect on feed compositions

| linear α-olefin | Feed 1 wt % | 2 wt % | 3 wt % | 4 wt % | 5 wt % | 6 wt % |
|---|---|---|---|---|---|---|
| C6 | 2.32 | 7.12 | 10.89 | 13.92 | 15.60 | 18.41 |
| C8 | 6.31 | 9.52 | 13.77 | 17.20 | 19.12 | 22.34 |
| C10 | 10.31 | 11.92 | 15.13 | 17.76 | 19.20 | 21.62 |
| C12 | 14.31 | 14.32 | 15.13 | 15.84 | 16.16 | 16.81 |
| C14 | 18.23 | 16.64 | 14.57 | 12.88 | 12.00 | 10.41 |
| C16 | 22.30 | 19.04 | 14.89 | 11.44 | 9.60 | 6.41 |
| C18 | 26.22 | 21.44 | 15.61 | 10.96 | 8.32 | 4.00 |
| Total | 100.00 | 100.00 | 100.00 | 100.00 | 100.00 | 100.00 |
| Av. Carbon Number | 13.24 | 12.00 | 10.93 | 10.19 | 9.83 | 9.27 |

TABLE 4

Properties of the poly-α-olefin made at 70° C.

| Example | Av. Carbon number | Feed | Kv 100° C., cS | VI | PP, ° C. |
|---|---|---|---|---|---|
| 26 | 13.24 | 1 | 80.84 | 193 | 3 |
| 27 | 12 | 2 | 77.46 | 190 | −3 |
| 28 | 10.93 | 3 | 80.18 | 188 | −15 |
| 29 | 10.19 | 4 | 81.95 | 184 | −36 |
| 30 | 9.83 | 5 | 85.24 | 185 | −36 |
| 31 | 9.27 | 6 | 88.79 | 185 | −45 |

TABLE 5

Properties of the poly-α-olefin made at 30° C.

| Example | Av. Carbon number | Feed | Kv at 100° C., cS | VI | PP, ° C. |
|---|---|---|---|---|---|
| 32 | 13.24 | 1 | 359.3 | 257 | 9 |
| 33 | 12 | 2 | 441.19 | 258 | −3 |
| 34 | 10.93 | 3 | 436.36 | 265 | −18 |
| 35 | 10.19 | 4 | 561.06 | 267 | −27 |
| 36 | 9.83 | 5 | 555.66 | 264 | −30 |
| 37 | 9.27 | 6 | 688.59 | 271 | −27 |

TABLE 6

Influence of catalyst type and reaction temperature on poly-α-olefin viscosity

| Example | Av. Carbon number | Catalyst Type | Rxn Temp, ° C. | Kv at 100° C., cS | Kv at 40° C., cS | VI | PP, ° C. |
|---|---|---|---|---|---|---|---|
| 38 | 12.00 | C | 22 | 38.65 | 268.88 | 188 | −3 |
| 39 | 12.00 | D | 110 | 199.44 | 1933.84 | 225 | −3 |
| 40 | 12.00 | C | 60 | 19.48 | 119.18 | 175 | −3 |

TABLE 7

Influence of poly-α-olefin average carbon number on the pour point of GTL/poly-α-olefin blends

| | | | | | Blend of poly-α-olefin in GTL6 | | | | | | | |
|---|---|---|---|---|---|---|---|---|---|---|---|---|
| | | | | | A | B | C | D | E | F | G | H |
| | poly-α-olefin reaction temp. and properties | | | | wt % poly-α-olefin in GTL6 | | | | | | | |
| Ex. | Av. carbon number | Rxn Temp, ° C. | Kv 100° C., cS | VI | 0.025 PP, ° C. | 0.05 PP, ° C. | 0.1 PP, ° C. | 0.2 PP, ° C. | 0.5 PP, ° C. | 1 PP, ° C. | 5 PP, ° C. | 10 PP, ° C. |
| | | | | | PP, ° C. | | | | | | | |
| 26 | 13.24 | 70 | 80.84 | 193 | 3 | −39 | −39 | −42 | −45 | −51 | −42 | −24 | — |
| 27 | 12 | 70 | 77.46 | 190 | −3 | −39 | −42 | −42 | −45 | −45 | −42 | −30 | — |
| 28 | 10.93 | 70 | 80.18 | 188 | −15 | −24 | −24 | −30 | −33 | −36 | −39 | −36 | — |
| 29 | 10.19 | 70 | 81.95 | 184 | −36 | −21 | −18 | −24 | — | — | −27 | −36 | −36 |
| 30 | 9.83 | 70 | 85.24 | 185 | −36 | −21 | −18 | −24 | — | — | −24 | −33 | −36 |
| 31 | 9.27 | 70 | 88.79 | 185 | −45 | −21 | −18 | −24 | — | — | −21 | −30 | −33 |
| 32 | 13.24 | 35 | 359.3 | 257 | 9 | −39 | −42 | −42 | −45 | −45 | −39 | −24 | — |
| 33 | 12 | 35 | 441.19 | 258 | −3 | −42 | −45 | −48 | −44.8 | −45 | −36 | −30 | — |
| 34 | 10.93 | 35 | 436.36 | 265 | −18 | −30 | −33 | −42 | −45 | −48 | −42 | −36 | — |
| 35 | 10.19 | 35 | 561.06 | 267 | −27 | −21 | −21 | −27 | — | — | −39 | −45 | −42 |
| 36 | 9.83 | 35 | 555.66 | 264 | −30 | −18 | −21 | −21 | — | — | −24 | −36 | −42 |
| 37 | 9.27 | 35 | 688.59 | 271 | −27 | −24 | −24 | −24 | — | — | −21 | −27 | −30 |
| 38 | 12 | 22 | 38.65 | 188 | −3 | — | — | — | — | — | — | — | — |
| 39 | 12 | 110 | 199.44 | 225 | −3 | −33 | −39 | −45 | −45 | −42 | −36 | −30 | — |
| 40 | 12 | 60 | 19.48 | 175 | −3 | −36 | −36 | −42 | −45 | −45 | −42 | −36 | — |

TABLE 8

Blends of GTL with poly-α-olefins or traditional PPD

| | Example | | | |
|---|---|---|---|---|
| | 41 | 42 | 43 | 44 |
| Base Stock | GTL6 | GTL6 | GTL6 | GTL6 |
| PPD type | Ex. 33 | Ex. 34 | none | Acryloid 156 |
| PPD wt % | 0.1 | 0.5 | 0 | 0.358 |
| Kv at 100° C., cS | 6.13 | 6.24 | 6.02 | 6.22 |
| Kv at 40° C., cS | 30.40 | 30.96 | 29.76 | 30.42 |
| VI | 142 | 143 | 141 | 147 |
| Pour Point, ° C. | −48 | −45 | −21 | −39 |
| Brookfield Viscosity at −30° C., cP | 3059 | 3499 | 26544 | 3589 |
| Brookfield Viscosity at −40° C., cP | 10838 | 10858 | 267543 | 33193 |
| Yield stress at −30° C. by D4684-5, Pa | <35 | <35 | <35 | <35 |
| Apparent Viscosity, 1, cP | <5000 | <5000 | 11897 | <5000 |

TABLE 9

Turbidity of poly-α-olefin/GTL blends

| poly-α-olefin fluid used in GTL Blend | | | I 0.001 wt % poly-α-olefin fluid | J 0.01 wt % poly-α-olefin fluid | K 0.05 wt % poly-α-olefin fluid | L 0.1 wt % poly-α-olefin fluid | M 0.2 wt % poly-α-olefin fluid |
|---|---|---|---|---|---|---|---|
| poly-α-olefin fluid Example | Av. Carbon number | Kv at 100° C., cS | Turbidity No. 0° C. | Turbidity No. 0° C. | Turbidity No. 0° C. | Turbidity No. 0° C. | Turbidity No. 0° C. |
| 26 | 13.24 | 80.84 | 1.77 | 1.80 | 1.78 | 1.59 | 1.49 |
| 27 | 12.00 | 77.46 | 0.76 | 0.87 | 0.83 | 0.78 | 0.77 |
| 28 | 10.93 | 80.18 | 0.79 | 0.88 | 0.78 | 0.82 | 0.83 |
| 29 | 10.19 | 81.95 | 0.75 | 0.84 | 0.78 | 0.83 | 0.82 |
| 30 | 9.83 | 85.24 | 0.75 | 0.80 | 0.76 | 0.77 | 0.80 |
| 31 | 9.27 | 88.79 | 0.81 | 0.86 | 0.80 | 0.79 | 0.78 |
| 32 | 13.24 | 359.30 | 0.95 | 1.23 | 1.17 | 1.07 | 1.08 |
| 33 | 12.00 | 441.19 | 0.99 | 1.21 | 1.23 | 1.08 | 1.05 |
| 34 | 10.93 | 436.36 | 0.98 | 1.20 | 1.18 | 1.11 | 1.10 |
| 35 | 10.19 | 561.06 | 0.91 | 0.94 | 0.93 | 0.84 | 0.82 |
| 36 | 9.83 | 555.66 | 0.90 | 0.93 | 0.87 | 0.83 | 0.83 |
| 37 | 9.27 | 688.59 | 0.89 | 1.06 | 0.95 | 0.83 | 0.85 |

Having described aspects of the hydrocarbon blends, its various features and components therein, the hydrocarbon blends can be further described by the illustrative numbered embodiments below:

1. A hydrocarbon blend comprising from 0.001 to 10 wt % of at least one poly-α-olefin, by weight of the hydrocarbon blend, the at least one poly-α-olefin having a $Kv^{100}$ within the range of from 10 to 3000 cSt and a molecular weight distribution within the range of from 1.0 to 4.5; and a base stock having a $Kv^{100}$ of less than 20.0 cSt; wherein the at least one poly-α-olefin is present in an amount sufficient to lower the pour point of the hydrocarbon blend by at least 5° C. relative to the pour point of the base stock.

2. The hydrocarbon blend of numbered embodiment 1, wherein the at least one poly-α-olefin is a copolymer comprising at least two sets of α-olefin-derived units in the polymer composition, wherein the first set is selected from $C_4$ or $C_6$ to $C_{10}$ or $C_{12}$ or $C_{13}$ α-olefins and the second set is selected from $C_{14}$ or larger α-olefins.

3. The hydrocarbon blend of numbered embodiments 1 and 2, wherein the second set of α-olefin-derived units is at least 20 wt % of the at least one poly-α-olefin.

4. The hydrocarbon blend of any of the previous numbered embodiments, wherein the second set of α-olefin-derived units is at least 30 wt % of the at least one poly-α-olefin.

5. The hydrocarbon blend of any of the previous numbered embodiments, wherein the second set of α-olefin-derived units is at least 40 wt % of the at least one poly-α-olefin.

6. The hydrocarbon blend of any of the previous numbered embodiments, wherein the at least one poly-α-olefin is produced from an α-olefin feed having an average carbon number of at least 8 or 9 or 10 or 10.5 or 11 carbon atoms.

7. The hydrocarbon blend of any of the previous numbered embodiments, wherein the at least one poly-α-olefin consists essentially of two or more $C_4$ or $C_6$ to $C_{24}$ α-olefin-derived units.

8. The hydrocarbon blend of any of the previous numbered embodiments, wherein the at least one poly-α-olefin is present in an amount to lower the pour point of the hydrocarbon blend by at least 5 or 10 or 15° C. relative to the pour point of the base stock.

9. The hydrocarbon blend of any of the previous numbered embodiments, wherein the base stock has a pour point of 10° C. or more.

10. The hydrocarbon blend of any of the previous numbered embodiments, wherein the base stock is a mixture selected from the group consisting of GTL base stocks, Gr. I, Gr. II, Gr. III, Gr. IV, Gr. V base stocks, and mixtures thereof, having a $Kv^{100}$ below 20.0 cSt.

11. The hydrocarbon blend of any of the previous numbered embodiments, wherein the base stock has a VI of at least 100.

12. The hydrocarbon blend of any of the previous numbered embodiments, wherein ethylene-derived units are substantially absent from the at least one poly-α-olefin.

13. The hydrocarbon blend of any of the previous numbered embodiments, wherein the at least one poly-α-olefin has a VI within the range of from 100 to 300.

14. The hydrocarbon blend of any of the previous numbered embodiments, wherein the hydrocarbon blend comprises within the range of from 99.999 to 30 or 40 or 50 wt % of the base stock.

15. The hydrocarbon blend of any of the previous numbered embodiments, also comprising one or more additives, wherein the additive is selected from the group consisting of oxidation inhibitors, antioxidants, dispersants, detergents, corrosion inhibitors, rust inhibitors, metal deactivators, anti-wear agents, extreme pressure additives, anti-seizure agents, non-olefin based pour point depressants, wax modifiers, viscosity index improvers, viscosity modifiers, fluid-loss additives, seal compatibility agents, friction modifiers, lubricity agents, anti-staining agents, chromophoric agents, defoamants, demulsifiers, emulsifiers, densifiers, wetting agents, gelling agents, tackiness agents, colorants, and blends thereof.

16. A lubricant or fuel made from the hydrocarbon blend of any of the previous numbered embodiments.

17. A method of forming a hydrocarbon blend of any of the previous numbered embodiments comprising (a) reacting a catalyst composition and a feed containing at least two sets of α-olefins, wherein the first set of α-olefins is selected from $C_4$ to $C_{13}$ α-olefins and the second set of α-olefins is selected from $C_{14}$ or larger α-olefins forming at least one poly-α-olefin having a $Kv^{100}$ at least 10.0 cSt; and (b) combining the at least one poly-α-olefin with a base stock having a $Kv^{100}$ below 20.0 cSt to form the hydrocarbon blend.

18. A method of forming a hydrocarbon blend of any of the previous numbered embodiments comprising (a) reacting a catalyst composition with an α-olefin feed having a number average carbon number of at least 8 or 9 or 10 or 10.5 or 11 carbon atoms forming at least one poly-α-olefin having a $Kv^{100}$ of at least 10.0 cSt; and (b) combining the at least one poly-α-olefin with a base stock having a $Kv^{100}$ below 20.0 cSt to form the hydrocarbon blend.

19. The method of numbered embodiment 17 and 18, wherein ethylene is substantially absent from the α-olefin feed.

20. The method of numbered embodiments 17-19, wherein the α-olefin feed has an average carbon number within the range of from 8 to 15 carbon atoms.

21. The method of numbered embodiment 18, wherein the α-olefin feed comprises at least two α-olefins selected from the group consisting of $C_6$ to $C_{24}$ α-olefins and mixtures thereof.

22. The method of numbered embodiment 18, wherein the feed comprises within the range of from 0.1 to 15 wt % $C_6$ α-olefins and at least 8 wt % $C_{18}$ α-olefins, based on the weight of the feed.

23. The method of numbered embodiment 17, wherein the feed comprises at least 20 wt % of α-olefins with $C_{14}$ or higher carbon numbers.

24. The method of numbered embodiment 17, wherein the feed comprises at least 30 wt % of α-olefins with $C_{14}$ or higher carbon numbers.

25. The method of numbered embodiment 17, wherein the feed comprises at least 40 wt % of α-olefins with $C_{14}$ or higher carbon numbers.

26. The method of numbered embodiments 17-25, wherein the catalyst composition comprises a metallocene and an activator.

27. The method of numbered embodiment 26, wherein the metallocene is a Group 4 bridged or unbridged bis-Cp compound. When unbridged, the metallocene can be described with respect to formula (1) above. When bridged, the metallocene comprising the bridging group "A" is described with respect to formula (2) above. In certain embodiments, the metallocene is a hafnocene or zirconocene having the features as described with respect to formula (1) and (2).

28. The method of numbered embodiments 17 and 18, wherein the reacting takes place at a temperature within the range of from 10 to 200° C.

29. The method of numbered embodiments 17 and 18, wherein the reacting takes place at a pressure of greater than 1.0 MPa.

30. The method of numbered embodiments 17 and 18, where the reacting takes place in the presence of a hydrogen partial pressure within the range of from 1 psi to 300 psi.

31. The method of numbered embodiments 17 and 18, where the reacting takes place with continuous hydrogen feed, with a hydrogen content of less than 1000 or 2000 or 3000 ppm in the reactor system.

32. The method of numbered embodiments 17 and 18, wherein the at least one poly-α-olefin is combined in an amount sufficient to lower the pour point of the hydrocarbon blend by at least 5 or 10 or 15° C. relative to the pour point of the base stock.

33. The method of numbered embodiments 17 and 18, wherein the base stock has a pour point below 10° C.

34. A lubricant or fuel made by the method of any of the previous numbered embodiments 17-33.

In another embodiment is the use of a poly-α-olefin comprising from 0.001 to 10 wt % of at least one poly-α-olefin, by weight of the hydrocarbon blend, the at least one poly-α-olefin having a $Kv^{100}$ within the range of from 10 to 3000 cSt and a molecular weight distribution within the range of from 1.0 to 4.5; and a base stock having a $Kv^{100}$ below 20.0 cSt; wherein the at least one poly-α-olefin is present in an amount sufficient to lower the pour point of the hydrocarbon blend by at least 5° C. relative to the pour point of the base stock.

In yet another embodiment is the use of a poly-α-olefin in a fuel or lubricant comprising from 0.001 to 10 wt % at least one poly-α-olefin, by weight of the hydrocarbon blend, the at least one poly-α-olefin having a $Kv^{100}$ within the range of from 10 to 3000 cSt and a molecular weight distribution within the range of from 1.0 to 4.5; and a base stock having a $Kv^{100}$ below 20.0 cSt; wherein the at least one poly-α-olefin is present in an amount sufficient to lower the pour point of the hydrocarbon blend by at least 5° C. relative to the pour point of the base stock.

In yet another embodiment is the use of a hydrocarbon blend comprising at least one poly-α-olefin as described herein as a fuel or lubricant comprising from 0.001 to 10 wt % poly-α-olefin.

What we claim is:

1. A method of forming a hydrocarbon blend comprising:
   (a) reacting a catalyst composition with an α-olefin feed having a number average carbon number of at least 10 carbon atoms, producing at least one poly-α-olefin having a $Kv^{100}$ of at least 10.0 cSt; and
   (b) combining the at least one poly-α-olefin with a base stock having a $Kv^{100}$ of about 6 cSt to form the hydrocarbon blend,
wherein the at least one poly-α-olefin is combined at 0.025 to 0.50 wt. % of the blend to lower the pour point of the hydrocarbon blend by at least 3° C. relative to the pour point of the base stock,
wherein the base stock is a GTL base stock, and
wherein the α-olefin feed has a number average carbon number from 10.93 to 13.24 carbon atoms.

2. The method of claim 1, wherein ethylene is substantially absent from the α-olefin feed.

3. The method of claim 1, wherein the α-olefin feed has a number average carbon number from 10.93 to 12.0 carbon atoms.

4. The method of claim 1, wherein the α-olefin feed comprises at least two α-olefins selected from the group consisting of $C_6$ to $C_{24}$ α-olefins and mixtures thereof.

5. The method of claim 1, wherein the feed comprises from 0.1 to 15 wt % $C_6$ α-olefins and at least 8 wt % $C_{18}$ α-olefins, based on the weight of the feed.

6. The method of claim 1, wherein the catalyst composition comprises a metallocene and an activator.

7. A lubricant or fuel made by the method of claim 1.

* * * * *